US007206864B2

(12) United States Patent
Enko et al.

(10) Patent No.: US 7,206,864 B2
(45) Date of Patent: Apr. 17, 2007

(54) NETWORK PROTOCOL PROCESSING DEVICE

(75) Inventors: Yutaka Enko, Sagamihara (JP); Yoji Nakatani, Yamato (JP); Takahiro Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 376 days.

(21) Appl. No.: 10/882,244

(22) Filed: Jul. 2, 2004

(65) Prior Publication Data
US 2005/0246450 A1   Nov. 3, 2005

(30) Foreign Application Priority Data
Apr. 28, 2004   (JP)   ............................. 2004-132442

(51) Int. Cl.
*G06F 15/16* (2006.01)
(52) U.S. Cl. ..................................................... 709/249
(58) Field of Classification Search ................. 709/249
See application file for complete search history.

(56) References Cited

U.S. PATENT DOCUMENTS

| | | | |
|---|---|---|---|
| 6,085,238 A * | 7/2000 | Yuasa et al. ................. | 709/223 |
| 6,334,153 B2 | 12/2001 | Boucher et al. | |
| 6,404,766 B1 | 6/2002 | Kitai et al. | |
| 6,427,173 B1 | 7/2002 | Boucher et al. | |
| 6,590,861 B1 * | 7/2003 | Vepa et al. .................. | 370/216 |
| 6,591,302 B2 | 7/2003 | Boucher et al. | |
| 6,822,957 B1 | 11/2004 | Schuster et al. | |
| 7,047,314 B2 * | 5/2006 | Sato et al. ................... | 709/238 |
| 7,114,096 B2 * | 9/2006 | Freimuth et al. ............. | 714/13 |
| 2002/0087721 A1 * | 7/2002 | Sato et al. ................... | 709/238 |
| 2002/0095519 A1 | 7/2002 | Philbrick et al. | |
| 2003/0081625 A1 * | 5/2003 | Matsufuru ................... | 370/412 |
| 2003/0135578 A1 * | 7/2003 | Banga et al. ................ | 709/215 |
| 2003/0140124 A1 | 7/2003 | Burns | |
| 2004/0062245 A1 * | 4/2004 | Sharp et al. ................. | 370/392 |
| 2005/0047329 A1 | 3/2005 | Almog | |

(Continued)

FOREIGN PATENT DOCUMENTS

JP    2001-268159    9/2001

(Continued)

OTHER PUBLICATIONS

D. Comer, "Internetworking with TCP/IP: Principles, Protocols and Architectures, 4th edition", 2000.

(Continued)

*Primary Examiner*—Andrew Caldwell
*Assistant Examiner*—Douglas Blair
(74) *Attorney, Agent, or Firm*—Antonelli, Terry, Stout & Kraus, LLP.

(57) ABSTRACT

Providing a network protocol processing device by which a server connected to a network logically parted on a user basis can offload TCP protocol processing. In a server having a network protocol processing function including: a host processor that processes user requests received through a network; and TOE equipment including a network port that is connected with the host processor, and connected with the network, a processor that performs TCP/IP protocol processing, and a memory that holds TCP connection identification information, information indicating a source IP address, a destination IP address, a source port number, and a destination port number, and frame information including VLAN-ID defined by IEEE802.1Q are used as TCP connection identification information.

1 Claim, 11 Drawing Sheets

U.S. PATENT DOCUMENTS

| | | | |
|---|---|---|---|
| 2005/0129040 A1* | 6/2005 | Kiel et al. | 370/412 |
| 2005/0141434 A1* | 6/2005 | Cornett | 370/252 |
| 2005/0204366 A1* | 9/2005 | Billau et al. | 719/324 |

FOREIGN PATENT DOCUMENTS

| | | |
|---|---|---|
| JP | 2001-339462 | 12/2001 |

OTHER PUBLICATIONS

A.S. Tanenbaum, "Computer Networks, 4th Edition", 2003.

Yeh, et al., Introduction to TCP/IP Offload Engine (TOE), version 1.0, Apr. 2002, 6 pages.

* cited by examiner

LOGICAL NETWORK CONFIGURATION DIAGRAM

FIG. 3

VLAN TAGGED ETHERNET FRAME (IEEE802.3, 802.1Q)

| # | FIELD NAME | OCTET LENGTH |
|---|---|---|
| 1 | PREAMBLE | 7 |
| 2 | SFD | 1 |
| 3 | DESTINATION MAC ADDRESS | 6 |
| 4 | SENDING SOURCE MAC ADDRESS | 6 |
| 5 | TPID (ITS VALUE IS FIXED TO 0x8100) | 2 |
| 6 | TCI | 2 |
| 7 | LENGTH OR TYPE | 2 |
| 8 | DATA OR LLC | 46~1500 |
| 9 | FCS | 4 |

FIG. 4

DETAILS OF TCI

| # | FIELD NAME | BIT LENGTH |
|---|---|---|
| 1 | USER PRIORITY | 3 |
| 2 | CFI | 1 |
| 3 | VID | 12 |

FIG. 7

AVAILABLE PORT LIST ~601

| # | PHYSICAL PORT NUMBER | VID | IP ADDRESS |
|---|---|---|---|
| 1 | 0 | 1 | 192.168.0.1 |

FIG. 8

ARP TABLE ~602

| # | IP ADDRESS | MAC ADDRESS |
|---|---|---|
| 1 | 192.168.0.1 | 00-11-22-00-11-01 |
| 2 | 192.168.0.2 | 00-11-22-00-11-02 |
| 3 | 192.168.0.3 | 00-11-22-00-11-03 |
| 4 | 192.168.0.4 | 00-11-22-00-11-04 |
| 5 | 192.168.0.5 | 00-11-22-00-11-05 |
| 6 | 192.168.0.254 | 00-11-22-00-11-fe |

FIG. 9

ROUTING TABLE ~603

| # | DESTINATION IP ADDRESS | NET MASK | INTERFACE | GATEWAY | METRIC |
|---|---|---|---|---|---|
| 1 | 192.168.0.1 | 255.255.255.255 | lo | 127.0.0.1 | 1 |
| 2 | 192.168.0.0 | 255.255.255.0 | eth0 | DIRECT | 1 |
| 3 | 127.0.0.0 | 255.0.0.0 | lo | 127.0.0.1 | 1 |
| 4 | 0.0.0.0 | 0.0.0.0 | eth0 | 192.168.0.254 | 1 |

FIG. 10

CONNECTION INFORMATION BLOCK (EXAMPLE 1)
~1001

| # | ITEM | VALUE |
|---|------|-------|
| 1 | VLAN-ID | 1 |
| 2 | SOURCE IP ADDRESS | 192.168.0.1 |
| 3 | DESTINATION IP ADDRESS | 192.168.0.2 |
| 4 | SOURCE PORT NUMBER | 2049 |
| 5 | DESTINATION PORT NUMBER | 700 |
| 6 | SOURCE MAC ADDRESS | 00-11-22-00-11-01 |
| 7 | DESTINATION MAC ADDRESS | 00-11-22-00-11-02 |
| 8 | SEND SEQ NUMBER | 0x10001000 |
| 9 | RECEIVE SEQ NUMBER | 0x20002000 |
| 10 | SEND WINDOW SCALE | 4 |
| 11 | RECEIVE WINDOW SCALE | 4 |
| 12 | SEND BUFFER ADDRESS | |
| 13 | RECEIVE BUFFER ADDRESS | |

FIG. 11

CONNECTION INFORMATION BLOCK (EXAMPLE 2)
~1101

| # | ITEM | VALUE |
|---|------|-------|
| 1 | VLAN-ID | 1 |
| 2 | SOURCE IP ADDRESS | 192.168.0.1 |
| 3 | DESTINATION IP ADDRESS | 192.168.0.2 |
| 4 | SOURCE PORT NUMBER | 2049 |
| 5 | DESTINATION PORT NUMBER | 700 |
| 6 | SOURCE MAC ADDRESS | 00-11-22-00-11-01 |
| 7 | DESTINATION MAC ADDRESS | 00-11-22-00-11-02 |
| 8 | SEND SEQ NUMBER | 0x10001000 |
| 9 | RECEIVE SEQ NUMBER | 0x20002000 |
| 10 | SEND WINDOW SCALE | 4 |
| 11 | RECEIVE WINDOW SCALE | 4 |
| 12 | SEND BUFFER ADDRESS | |
| 13 | RECEIVE BUFFER ADDRESS | |
| 14 | ARP TABLE ADDRESS | |
| 15 | ROUTING TABLE ADDRESS | |

NETWORK PROTOCOL PROCESSING DEVICE

CLAIM OF PRIORITY

The present application claims priority from Japanese application serial No. 2004-132442, filed on (Apr. 28, 2004), the content of which is hereby incorporated by reference into this application.

BACKGROUND OF THE INVENTION

The present invention relates to a network protocol processing device, and more particularly to TOE (TCP/IP Offload Engine) equipment that specializes in network protocol processing of a host computer whose resources are virtually parted on a user basis, and a server equipped with it.

TCP/IP (Transmission Control Protocol/Internet Protocol) is known as a communication protocol most widely used for network communications among computers, including the Internet. However, TCP/IP, particularly TCP protocol, imposes a heavy load on a host processor because of the complexity of processing for the protocol.

Network communication technologies in recent years, particularly speed-enhancement technologies for Ethernet (Ethernet is a trademark of Xerox Co.) have advanced so remarkably that 1-GbE Ethernet with a transfer speed of 1 gigabits/s has recently become a mainstream. Furthermore, in next several years, 10-GbE Ethernet with a transfer speed of 10 gigabits/s is expected to become prevalent.

In general, it is said that 1 Hz worth of CPU processing capability is necessary for TCP/IP data transfer of 1 bit/s. According to this estimate, a processor processing capability of about 10 GHz is required for TCP protocol processing of 10 Gbit/s. However, a clock frequency of general processors will stay at several gigahertz at a time when 10 GbE becomes prevalent in several years. The processing capability will not be sufficient for processing of 10 GbE. In other words, data cannot be transferred with a band width, which determines physical performance of a network. Or, a host processor may cause a delay in primary service tasks to be done because of protocol processing overhead.

Therefore, attention is directed to a dedicated hardware device that performs (offloads) TCP protocol processing in place of a host processor. This device is called TOE (TCP/IP Offload Engine). The TOE equipment can be installed in a server to concentrate on network protocol processing. This contributes to good network performance and reducing loads on the host processor so that an increase in service processing performance, which is a primary objective of the host processor, can be achieved.

As technologies concerning the TOE equipment, for example, in Japanese Published Unexamined Patent Application No. 2001-268159 (Patent Document 1), a device that processes TCP/IP by hardware, that is, TOE equipment and its operation method are disclosed. In addition, in Japanese Published Unexamined Patent Application No. 2001-339462 (Patent Document 2), a communication protocol processing method by the TOE is disclosed. Furthermore, in U.S. Pat. No. 6,427,173 (Patent Document 3), U.S. Pat. No. 6,334,153 (Patent Document 4), and U.S. Pat. No. 6,591,302 (Patent Document 5), examples of TCP/IP offload engine are disclosed.

In U.S. Unexamined Patent Publication No. 2003/0135578 (Patent Document 7), there is disclosed a server connected to plural networks, wherein an independent private address space is defined in each of the networks, and wherein the server is a virtual server having plural logical spaces. This server provides independent services for each of IP address identifiers (Space-ID) of the networks.

SUMMARY OF THE INVENTION

By the way, the following problems are pointed out for application of the TOE equipment to a server that is logically parted on a user basis as described in the U.S. Unexamined Patent Publication No. 2003/0135578 (Patent Document 6).

In general, in the world of IP networks, only one global IP address space (WAN: Wide Area Network) defined by use of a global IP address exists in the world. In contrast, LAN (Local Area Network) (here, it refers to a network defined by use of a private IP address space) exists for each of organizations, wherein the LAN is defined by use of a private IP address, and used in an enterprise organization and the like.

A conventional server is ordinarily operated being connected to the inside of an organization, that is, a single LAN (Local Area Network). Therefore, the server has had only to function in only one private IP address space, without having to service requests from plural LANs.

However, the following problems occur in the case where the server is installed in a place such as a data center, where networks owned individually by plural organizations are consolidated using VLAN (virtual LAN) (VLAN is defined by IEEE802.1Q).

That is, plural LANs each having a private IP address space, defined for plural organizations, exist in the data center. Therefore, the server must individually service requests from individual LANs (that is, each private IP address space).

To perform the TCP/IP protocol processing, the TOE equipment must hold the identification information of TCP connection in which a source host is established as one end (e.g., socket end). Conventional TOE equipment uses, as connection identification information, a set of a source IP address number, a destination IP address number, a destination port number, and a destination port number. With this method, however, since information indicating to which network a packet belongs is lacking, in the cases where connections are made to plural LANs, it is impossible to determine to which LANs the connections belong.

Therefore, in networks within a data center employing conventional TOE equipment, IP addresses had to be assigned so as not to conflict with each other. Thus, it has been very inconvenient to manage IP addresses so that they do not conflict with each other even among different enterprises.

Moreover, for conventional TOE equipment, there are some systems in which a host processor establishes TCP connections and passes state information to the TOE equipment, while there are others in which the TOE equipment establishes TCP connections. In either case, the host processor requires an interface between the host processor and the TOE equipment through which TCP connection identification information is passed to the TOE equipment. The identification information has to include information about networks to which the connections belong.

Moreover, when the TOE equipment establishes a connection, to know to which gateway or host processor a packet to a destination host has to be passed, it has to refer to a routing table and an ARP table. The routing table and the ARP table have to be provided for each of private IP networks. Conventional TOE equipment is not designed to refer to different routing tables and ARP tables for different LANs (private IP address spaces).

An object of the present invention is to provide TOE equipment capable of offloading TCP protocol processing of a server connected to plural networks logically parted.

Another object of the present invention is to provide a network protocol processing device that can identifiably separate a network up to a TCP connection level.

A network protocol processing device according to the present invention identifies a TCP connection, using information including a source IP address, a destination IP address, a source port number, and a destination port number, and information including VLAN-ID defined by IEEE802.1Q. By this arrangement, a network can be identified up to the TCP connection level (the session level of OSI reference model) by VLAN-ID defined by IEEE802.1Q.

Preferably, the present invention is achieved by a server comprising: a host processor that processes user requests received through a network, and TOE equipment including a network port that is connected with the host processor, and connected with the network, a processor that performs TCP/IP protocol processing, and a memory that holds TCP connection identification information, wherein information indicating a source IP address, a destination IP address, a source port number, and a destination port number, and frame information including VLAN-ID defined by IEEE802.1Q are used as TCP connection identification information.

Also, preferably, the server includes an interface for receiving TCP connection identification information including VLAN-ID from the host processor, and the host processor transfers the TCP connection identification information including VLAN-ID to the TOE equipment.

In a network protocol processing method according to the present invention in a server that performs protocol processing for a network logically parted to plural networks, the method comprises the steps of: in a host processor, creating a TCP connection table that registers, as TCP connection information of network setting information of a certain user, at least information indicating a source IP address, a destination IP address, a source port number, and a destination port number, and information including an ID defined to logically part the network into plural networks, preferably VLAN-ID defined by IEEE802.1Q, and establishing a TCP connection; passing the TCP connection information from the host processor to TOE equipment; and in the TOE equipment, newly creating a connection table based on the TCP connection information, and registering information about the connection table in a connection list.

The network protocol processing method comprises the steps of: in the TOE equipment, searching the connection list to check weather the connection table is registered; and as a result of the checking, if the connection table is registered and data to be sent exists, creating a TCP/IP packet from the data, storing VLAN-ID defined by IEEE802.1Q in a specific field of the packet, and sending the packet to the network.

As an example, the network protocol processing method uses a send buffer and a receive buffer referred to from the connection table separated by TCP connection identification information as a data interface with the host processor, wherein, during sending, a packet is extracted from the send buffer, and VLAN-ID is included in a send packet to send the send packet, while, during receiving, a connection is identified by use of VLAN-ID included in a packet received from the network and the packet is stored in a receive buffer referred to from a connection table separated by the VLAN-ID.

According to the present invention, TCP protocol processing of a server connected with a network parted logically on a user basis can be off loaded, and the network can be identified up to a TCP connection level. As a result, the performance of the network can be fully delivered to prevent reduction in the load on the host processor.

BRIEF DESCRIPTION OF THE DRAWINGS

FIG. 3 is a drawing showing the configuration of an Ethernet frame provided with a VLAN tag in one embodiment;

FIG. 4 is a drawing showing details of TCI in one embodiment;

FIG. 7 is a drawing showing an example of an available port list 601 shown in FIG. 6;

FIG. 8 is a drawing showing an example of an ARP table shown in FIG. 6;

FIG. 9 is a drawing showing an example of a routing table 603 shown in FIG. 6;

FIG. 10 is a drawing showing an example 1 of a connection information block in one embodiment;

FIG. 11 is a drawing an example 2 of a connection information block in one embodiment;

DESCRIPTION OF THE EMBODIMENTS

Hereinafter, embodiments of the present invention will be described in detail with reference to the drawings.

Figure 1:
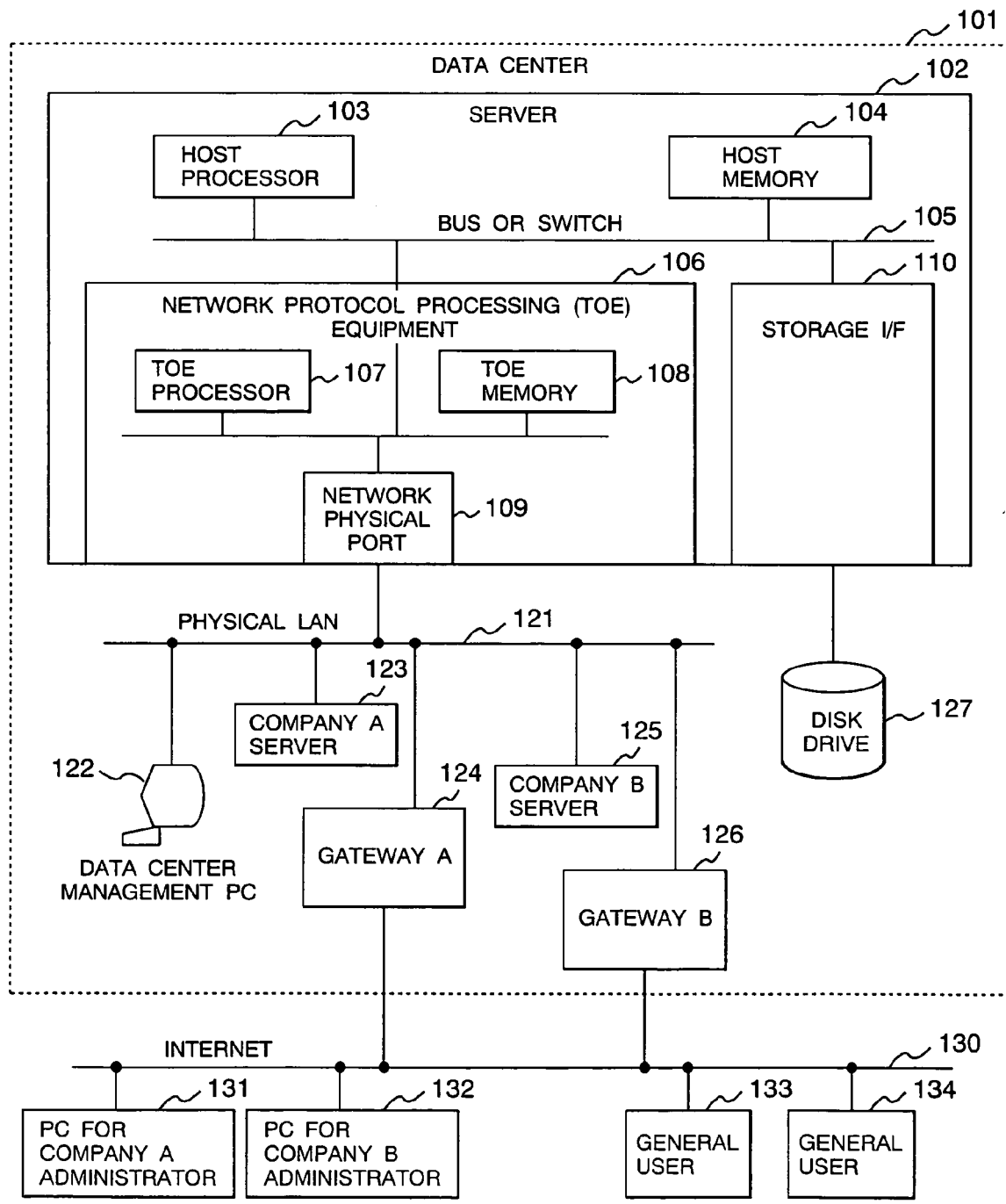
FIG. 1 is a drawing showing a physical configuration of a network including a server 102 according to one embodiment of the present invention.

FIG. 1 is a drawing showing a physical configuration of a network in which a server is used in one embodiment.

A server 102, installed within a data center 101, includes a host processor 103, a host memory 104, TOE equipment 106 serving as a network protocol processing device, a storage I/F 110, and a bus or switch 105 that connects these components.

The TOE equipment 106 includes a TOE processor 107, a TOE memory 108, and a network physical port 109. These components are connected with each other, and connected with the host processor 103 and the host memory 104 within the server 102 through a bus such as PCI or a switch. The server 102 is connected with other computers such as a data center management PC 122, plural servers 123 and 125, and gateways 124 and 126 through a physical LAN 121.

The data center 101 is connected to PCs 131 and 132 of company users or PCs 133 and 134 of general users through the Internet 130.

Logical Partition of Network by IEEE802.1Q

Figure 2:
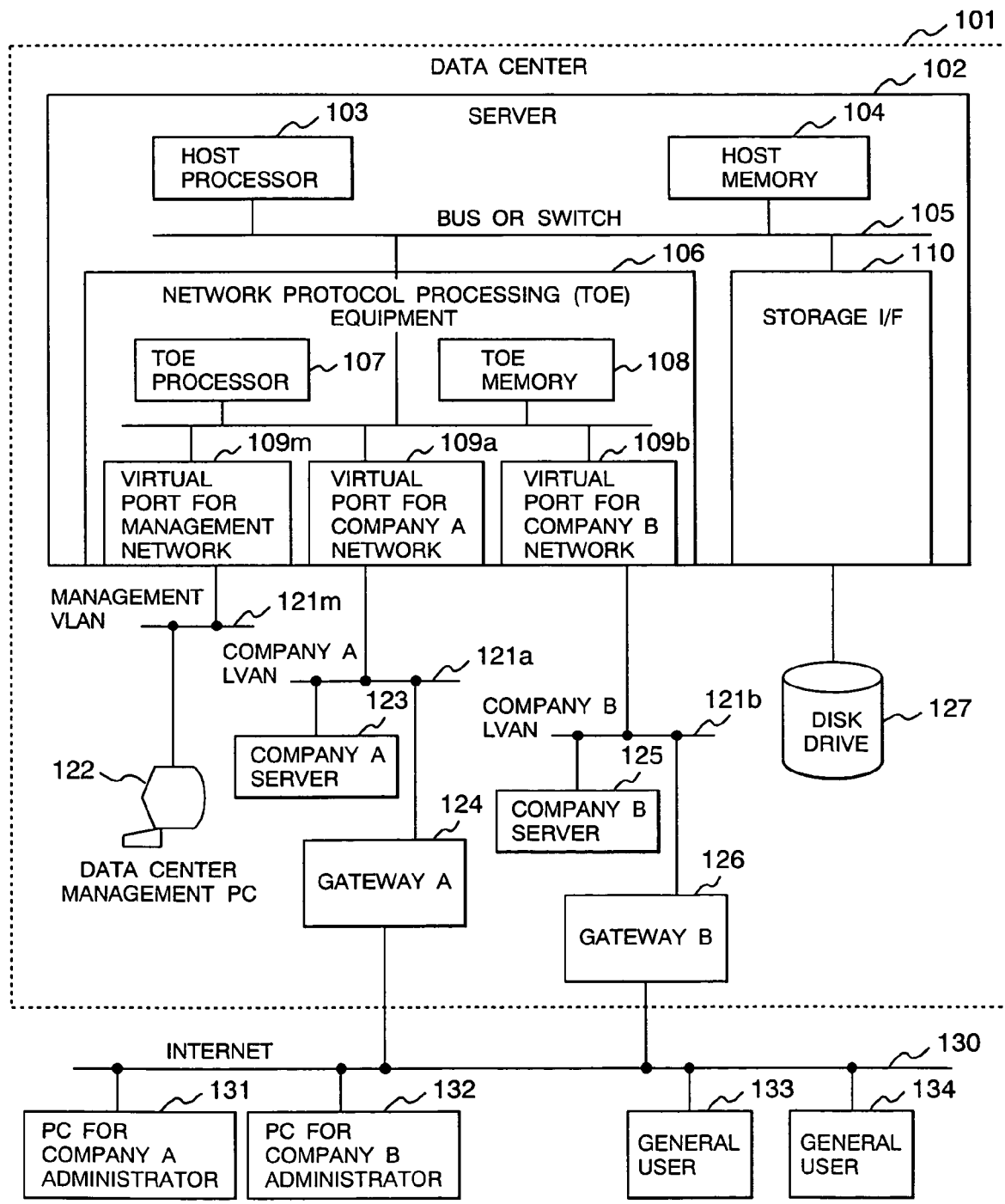
FIG. 2 is a drawing showing a physical configuration of a network including the server 102 according to one embodiment.

The physical port 109 and the physical LAN 121 shown in FIG. 1 are logically parted as shown in FIG. 2 by the VLAN function defined by IEEE802.1Q.

Hereinafter, the configuration of a logical network will be described with reference to FIG. 2.

The network physical port 106 (109 of FIG. 1) in the TOE equipment is logically parted to plural virtual ports such as 109*m*, 109*a*, and 109*b* of FIG. 2, using the VLAN tag function of IEEE802.1Q. A network connected out of the server 102 from the individual virtual ports is logically parted to plural virtual networks (VLAN) 121*m*, 121*a*, and 121*b*, using the VLAN tag function of IEEE802.1Q.

The physical port and the network are logically parted in a way described below.

FIG. 3 shows an Ethernet packet frame transmitted over the network of this example. The packet includes fields of an Ethernet frame defined by ordinary IEEE802.3, such as an information train of preamble, SFD, destination MAC address, source MAC address, length or type, data or LLC, and FCS. Additionally, the packet includes an information train of VLAN tag fields defined by IEEE802.1Q, such as information of TPID (Tag Protocol ID) and TCI (Tag Control Information). TPID contains a value (0x8100) indicating that the frame is a tagged frame.

FIG. 4 shows details of TCI.

TCI includes a 3-bit user priority field, which is priority information set by a user application, a 1-bit CFI (Canonical Format Identifier) field, and a 12-bit VID (VLAN tag Identifier) field. A VLAN tag number is stored in the VID (VLAN tag Identifier) field.

In IEEE802.1Q, by including the VID in Ethernet packets transmitted to a network, the network is logically parted to plural networks. For example, with "1" assigned to VID of Ethernet frames for Company A and "2" assigned to VID of Ethernet frames for Company B, the values assigned to the individual organizations are stored in the VID field. According to the values of the VID field of the packet, physically one network is virtually parted to plural networks. In this example, the physical network 121 is logically parted to three networks, that is, VLAN121*m* for management, VLAN121*a* for Company A, and VLAN121*b* for Company B.

Logical Partition within Server

Figure 5:
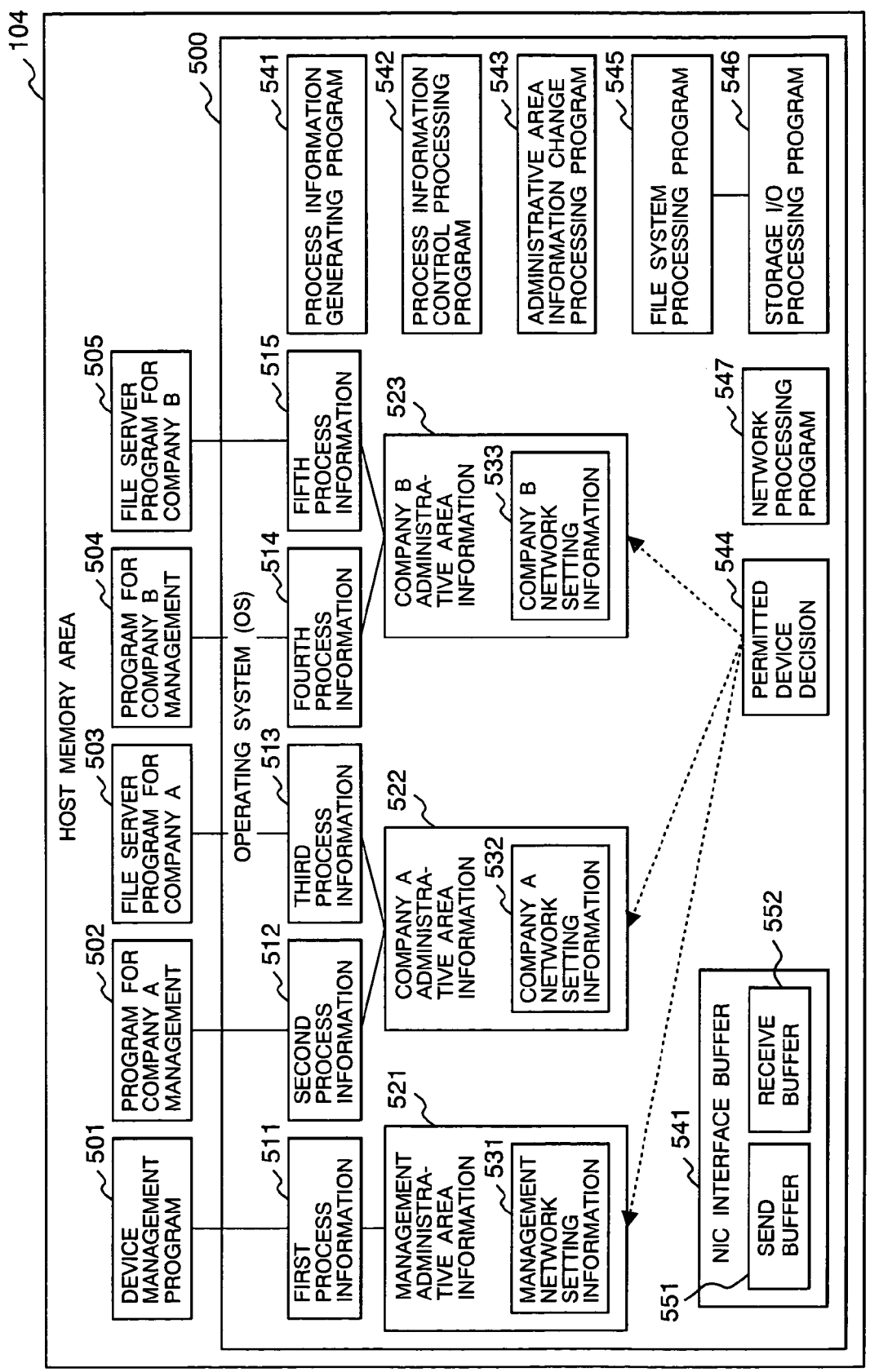
FIG. 5 is a drawing showing a host memory 104 in one embodiment.

FIG. 5 shows a storage structure of the host memory.

The host memory 104 of the server 102 stores application programs such as a program for apparatus 501, a program for Company A management 502, a file server program for Company A 503, a program for Company B management 504, and a file server program for Company B 505. These programs are usually stored in the disk drive 127, read as required, and stored in the host memory 104.

The program for apparatus 501, which is an application program running on the server 102, communicates with the data center management PC 122, starts the program for Company A management 502 and the program for Company B management 504, and changes permission for the access of devices such as the disk drive 127 to Company A administrative area information 522 and Company B administrative area information 523.

The program for Company A management 502 performs settings for the running of the file server program for Company A 503, and starts the file server program for Company A 503. In addition, the program for Company A management 502 communicates with the company A server 123, and stops and restarts the file server program for Company A 503.

The file server program for Company A 503 accepts a file access request from the Company A server 123, uses a file system processing program 543 provided by the operating system (OS) 500 to read or write a file from or to the disk drive 127, and returns results to the Company A Web server 123.

The program for Company B management 504 and the file server program for Company B 505 operate like the program for Company A management 502 and the file server program for Company A 503.

Various information is stored in the operating system (OS) 500. Based on the information, the operating system 500 provides various interfaces to the abovementioned application programs 501 to 505 running on the server 102 to control process information, perform I/O processing, and provide file system services.

Information stored in the host memory 104 includes first process information 511, second process information 512, third process information 513, fourth process information 514, and fifth process information 515, which are required to assign the host processor 103 serving as an execution entity in the abovementioned application programs 501 to 505. Other information stored in the host memory 104 includes management administrative area information 521, Company A administrative area information 522, and Company B administrative area information 523, which are permission information and limitation information regarding accessible devices and the like when different types of application programs are executed based on the abovementioned information. The administrative area information 521 to 523 include network setting information 531 to 533. The management administrative area information 521 includes management network setting information 531. The Company A administrative area information 522 includes Company A network setting information 532. The Company B administrative area information 523 includes Company B network setting information 533.

Furthermore, a variety of processing programs are stored in the operating system (OS) 500. The processing programs, which refer to programs for achieving the functions of the OS, include the following programs: a process information generating program 541 called when process information is generated; a process information control processing program 542 that performs halt, end, restart, and other control operations for an application program indicated by process information; an administrative area information change processing program 543 called when information indicating permission and limitation of devices accessible to an application program indicated by process information is changed; a permitted device decision 544 that checks the validity of access to devices; a file system processing program 545 that provides file system services; a storage I/O processing program 546 that performs input/output on a disk drive 127 connected to a storage I/F 110; and a network processing program 547 that conducts communication through a network physical port.

The first process information 511 is process information indicating the program for apparatus 501, and is information for managing the operation of the program for apparatus 501. The first process information 511 belongs to the management administrative area information 521. Based on the information, accessible devices are limited.

The second process information 512 is process information indicating the program for Company A management 502, and is information for managing the operation of the program for Company A management 502. The third process information 513 is process information indicating the file server program for Company A 503 and is information for managing the operation of the file server program for Company A 503. The second process information 512 and the third process information 513 belong to Company A administrative area information 522. Based on the information, accessible devices are limited.

The fourth process information 514 is process information indicating the program for Company B management 504, and is information form an aging the operation of the program for Company B management 504. The fifth process information 515 is process information indicating the file server program for Company B 505, and is information for managing the operation of the file server program for Company B 505. The fourth process information 514 and the fifth process information 515 belong to the Company B administrative area information 523. Based on the information, accessible devices are limited.

The management administrative area information 521 can be accessed from an administrator PC 122 through the management VLAN 121m only by a data center administrator to manage devices. The management administrative area information 521 is managed to hold information for managing access rights to all devices.

To provide operation administrative area information of the file server program for Company A 503, the Company A administrative area information 522 is managed by the PC 122 for a data center administrator to hold information for managing access rights to network virtual port 109a and the disk drive 127 permitted to Company A by a contract between the data center 101 and the Company A. Access rights to the disk drive 127 and the use of the virtual port for Company A network 109a by the file server 503 of Company A are permitted by the contract.

To provide operation administrative area information of the file server program for Company B 505, the Company B administrative area information 523 is managed by the PC 122 for a data center administrator to hold information for managing access rights to network virtual port 109b and the disk drive 127 permitted to Company B by a contract between the data center 101 the Company B. Access rights to the disk drive 127 and the use of the virtual port for Company B network 109a by the file server 505 of Company B are permitted by the contract.

The process information generating program 541 is a program called by the program for apparatus 501, the program for Company A management 502, and the program for Company B management 504. The process information generating program 541 has a function for generating process information belonging to the same administrative area information as an application program calling it. Additionally, it has a function for generating new administrative area information by specifying administrative area information to generate process information belonging to the administrative area information. The function for generating new administrative area information is possible only by executing the program for apparatus 501 belonging to the management administrative area information 521. That is, administrator authority is granted only to the data center administrator.

The process information control processing program 542 can perform halt, end, restart, and other control operations for an application program indicated by process information. This control function can be effected on all application programs from the program for apparatus 501 indicated by the first process information 511 belonging to the management administrative area information 521. However, from application programs (programs indicated by the second process information 512 through the fifth process information 515 that belong to the Company A administrative area information 522 and the Company B administrative area information 523) indicated by process information belonging to other than the management administrative area information 521, the control function can be effected only on application programs belonging to the same administrative area information.

The administrative area information change processing program 543 can set and change the permission and prohibition of access to specified administrative area information. This function can be executed only by the program for apparatus 501 indicated by the first process information 511 belonging to the management administrative area information 521. That is, administrator authority is granted only to the data center administrator.

The permitted device decision 544, for an access request to a device from an application program, refers to the administrative area information to which process information indicating the application program requesting the access belongs. If the application program is not permitted to access the device, access to the device fails.

The file system processing program 543 manages data placement on a disk and enables the provision of name space of tree structure and file storage by use of a disk area. In the name space, a tree root called a root directory is represented by "/", serving as a starting point of file name search. The name space also has tree nodes called directories having a name, and tree leaves called files having a name. A directory stores lower directories and file names. "/" is used to separate directories. For names of tree structure created on plural disks, one root can be connected to a node by a mount operation. The administrative area information 521 to 523 have a mount table of a file system so that the tree can be changed partially for each of the administrative area information. During the generation of administrative area information, the route directory of the administrative area information to be generated can be changed to a specified directory. This operation makes it possible to prevent files of other than the specified directory from being accessed from application programs indicated by process information belonging to the administrative area information.

The storage I/O processing program 546 performs input-output operations on the disk drive 127 connected to the storage I/F 110. An application program indicated by process information having an input-output request first opens a storage device in the storage I/O processing program and obtains a handle in subsequent processing. In open processing, the application program calls the permitted device decision 544 to determine whether access to the specified device is permitted. When not permitted, the open processing cannot be performed and access to the device fails.

The network processing program 544 communicates with other servers through the network protocol processing (TOE) equipment 106. The network processing program 544 stores programs used to establish a TCP connection. The host processor executes the programs to establish a TCP connection.

Figure 6:
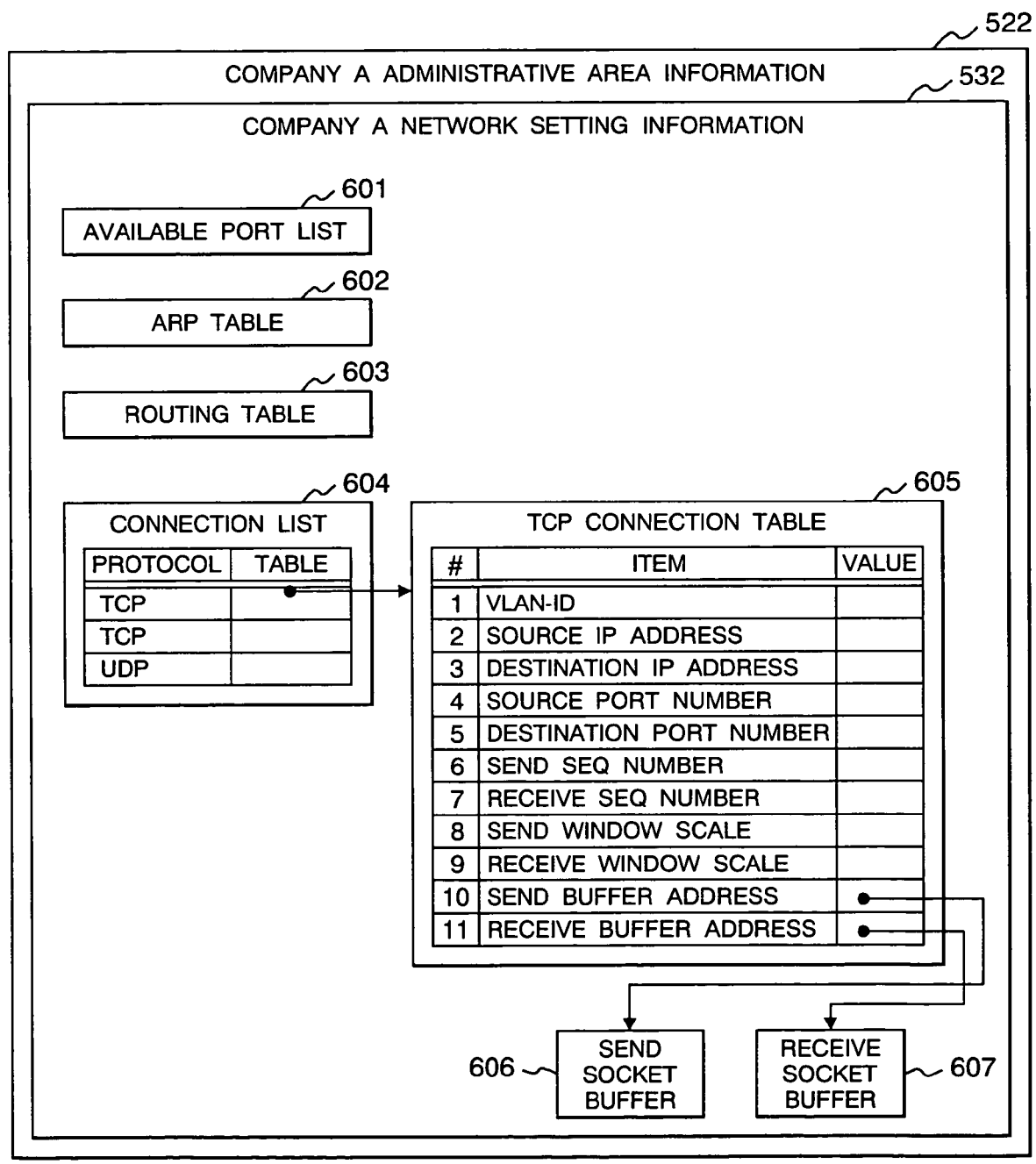
FIG. 6 is a drawing showing an example of Company A administrative area information stored in the host memory 104.

FIG. 6 shows a detailed example of the Company A administrative area information 522 in FIG. 5.

The Company A administrative area information 522 includes the Company A network setting information 532.

The network setting information 532 includes an available port list 601, an ARP table 602, a routing table 603, a connection list 604, and a TCP connection table 605.

FIG. 7 shows a detailed example of the abovementioned available port list 601.

The port list 601 contains a network port available to Company A. In this example, Company A can use a virtual port with a physical port number of "0" and VID of "1", and its IP address is 192.168.0.1.

FIG. 8 shows a detailed example of the abovementioned ARP table 602.

The ARP table 602 shows the correspondence between the IP addresses of other hosts connected to an identical VLAN and MAC addresses. In the example of the drawing, a first entry shows that the MAC address of a host whose IP address is 192.168.0.1 is 00-11-22-00-11-01. A second entry shows that the MAC address of a host whose IP address is 192.168.0.2 is 00-11-22-00-11-02. The same is also true for other entries.

FIG. 9 shows a detailed example of the routing table 603.

The routing table is a table showing the next host (next step) to which the packet is to be transferred, when an IP address of a destination host is given. The routing table 603 shown is an example of that included in the Company A network setting information 532; the IP address of a host allocated to a Company A's administrative area is 192.168.0.1, and a default gateway is 192.168.0.254.

A first entry indicates that an IP packet to a host (its own host) having an IP address of 192.168.0.1 is to be sent to 127.0.0.1 (local host address) via "lo" (loopback) interface. A second entry indicates that a packet to 192.168.0.0 (low-order 16 bits may be of any value because net mask is 255.255.0.0) is to be directly sent to a destination IP address via "eth0" interface without going through a gateway.

A third entry indicates that a packet to 127.0.0.0 (low-order 24 bits may be of any value because net mask is 255.0.0.0) is to be sent to 127.0.0.1 (local host address) via "lo" (loopback) interface. A fourth entry indicates that packets of IP addresses not matching any of the abovementioned entries are to be sent to 192.168.0.254 (default gateway) via "eth0" interface.

The "metric" column of the table, which indicates a distance up to a destination host, is used for route comparison when plural reachable routes are found. In this example, however, the "metric" column is all set to "1" so that it is not used for comparison.

Moreover, the connection list 604 and the TCP connection table 605 are included in the network setting information 532. The TCP connection table 605 includes TCP connection information generated by a process under Company A's environment. A TCP connection table 605 is generated for each TCP connection. The connection list 604 stores a list of TCP connection tables 605 generated in Company A's environment in the form of a list of pointers.

A send socket buffer 606 and a receive socket buffer 607 are generated for each TCP connection. Send data and receive data are stored in each of the buffers, which are used as an interface for data exchange between the host and the TOE equipment. Their addresses are respectively stored in a send socket buffer address field (#10 of 605) and a receive socket buffer address field (#11 of 605) of the TCP connection table 605.

Establishing TCP Connection

In the server of this embodiment, the host processor 103 executes a procedure for establishing a TCP connection. The TOE equipment 106 operates as an ordinary NIC (Network Interface Card) until the TCP connection is established. The TOE equipment 106 extracts a packet stored in the form of Ethernet frame from the send buffer 551 of the NIC interface buffer 541 in the host memory area 104, and sends it to the network. It also stores a packet received from the network in the receive buffer 552 of the NIC interface buffer 541 in the host memory area in the form of Ethernet frame. As long as the TOE equipment is operating as NIC, the host processor exchanges data with the TOE equipment through the send buffer 551 and the receive buffer 552 of the NIC interface buffer 541. This is performed at the level of Ethernet frame. As long as the TOE equipment is operating as NIC, the host processor performs TCP/IP protocol processing.

When the host processor 103 executes a connection establishment instruction written to the Company A file server program 503, a TCP connection table 605 is generated within the Company A network setting information 532 within the Company A administrative area information 522 on the host memory 104, and a new entry is generated in the connection list 604 to register the address of the TCP connection table 605. Furthermore, a send socket buffer 606 and a receive socket buffer 607 are allocated, and their addresses are respectively set in a send socket buffer address field (#10 of 605) and a receive socket buffer address field (#11 of 605) of the TCP connection table 605.

The host processor 103 executes a procedure for establishing the TCP connection with a destination host. When the connection is established, VLAN-ID allocated to Company A, that is, the Value of VID shown in the available port list 601 is stored in a VID field (#3 of FIG. 4) of an Ethernet header (FIG. 3). The TCP connection is established according to a procedure generally known as the three way hand shake method.

When the host processor 103 has established the TCP connection with the destination host, contents shown below are stored in the TCP connection table 605 showing the state of the connection.

(1) VLAN-ID: ID number of VLAN with which this connection is established.

(2) Source IP address: IP address of Company A virtual server. Extracted from the available port list.

(3) Destination IP address: IP address of a host as a communication destination. Specified from the file server program for Company A.

(4) Source port number: Source's own port number. Specified from the file server program for Company A.

(5) Destination port number: Port number of communication destination. Specified from the file server program for Company A.

(6) Send SEQ number: A sequence number of a send stream. Decided by a connection establishment procedure.

(7) Receive SEQ number: A sequence number of a send stream. Decided by a connection establishment procedure.

(8) Send window scale: A bit shift value of send window size. Decided by a connection establishment procedure.

(9) Receive window scale: A bit shift value of receive window size. Decided by a connection establishment procedure.

(10) Send buffer address: Address of send socket buffer.

(11) Receive buffer address: Address of receive socket buffer.

Offloading TCP Connection

When the TCP connection has been established, the host processor 103 stores connection state information of the host in a connection information block 1001 shown in FIG. 10 and passes it to the TOE equipment 106. The fields of the connection information block 1001 are described below.

(1) VLAN-ID: Copied from the TCP connection table.
(2) Source IP address: Same as the above.
(3) Destination IP address: Same as the above.
(4) Source port number: Same as the above.
(5) Destination port number: Same as the above.
(6) Source MAC address: MAC address of physical port within the source host. Obtained by searching the ARP table by use of the source host IP address as a key.
(7) Destination MAC address: MAC address of destination host or gateway. The routing table is searched by use of the destination IP address as a key to obtain a send destination IP address, and the ARP table is further searched to obtain the MAC address of the send destination IP address.
(8) Send SEQ number: Copied from the TCP connection table.
(9) Receive SEQ number: Same as the above.
(10) Send window scale: Same as the above.
(11) Receive window scale: Same as the above.
(12) Send buffer address: Same as the above.
(13) Receive buffer address: Same as the above.

Figure 12:
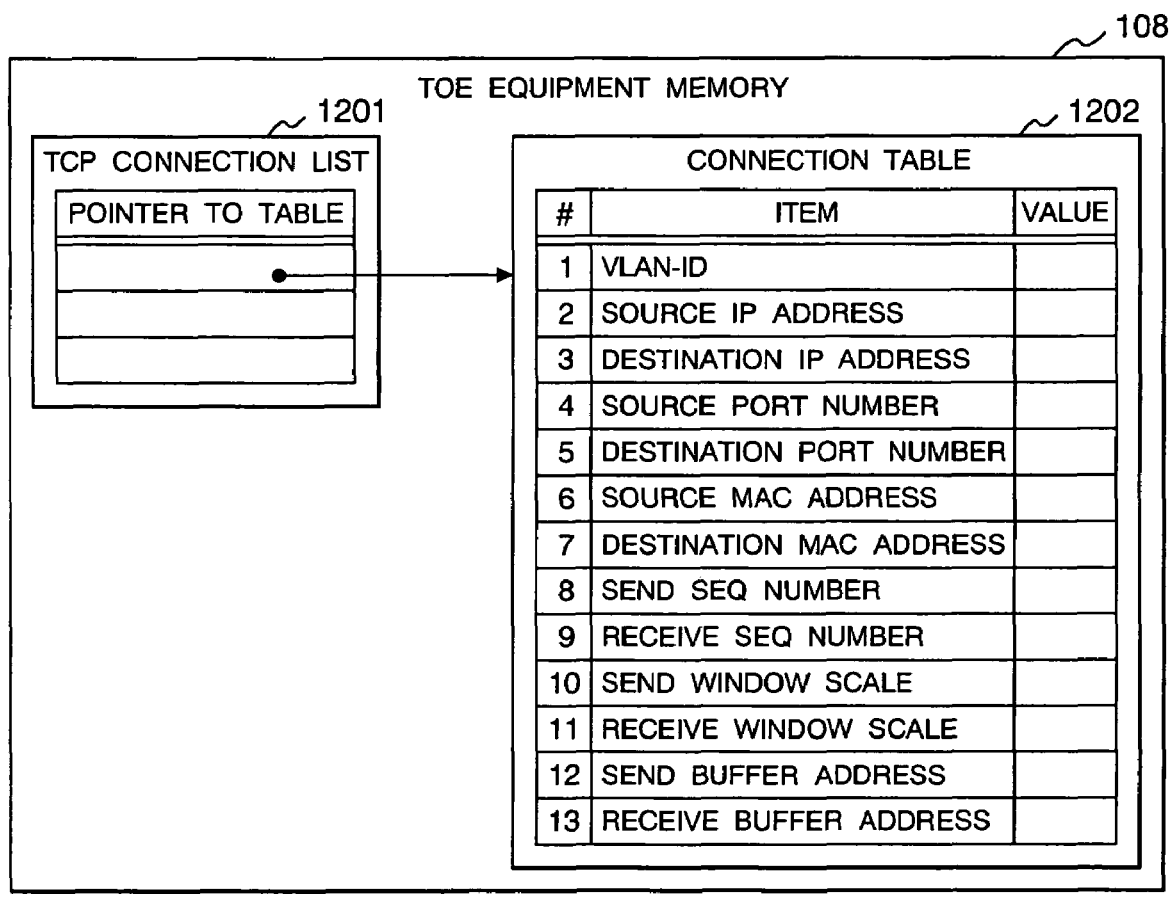
FIG. 12 a drawing showing an example 1 of a TOE equipment memory 108 in one embodiment.

In the TOE equipment 106, based on information of the connection information block 1001, the TOE processor 107 newly generates one connection table 1202 in the TOE equipment memory 108 as shown in FIG. 12, and additionally registers a pointer to this table to the connection list 1201.

Send Procedure

Figure 14:
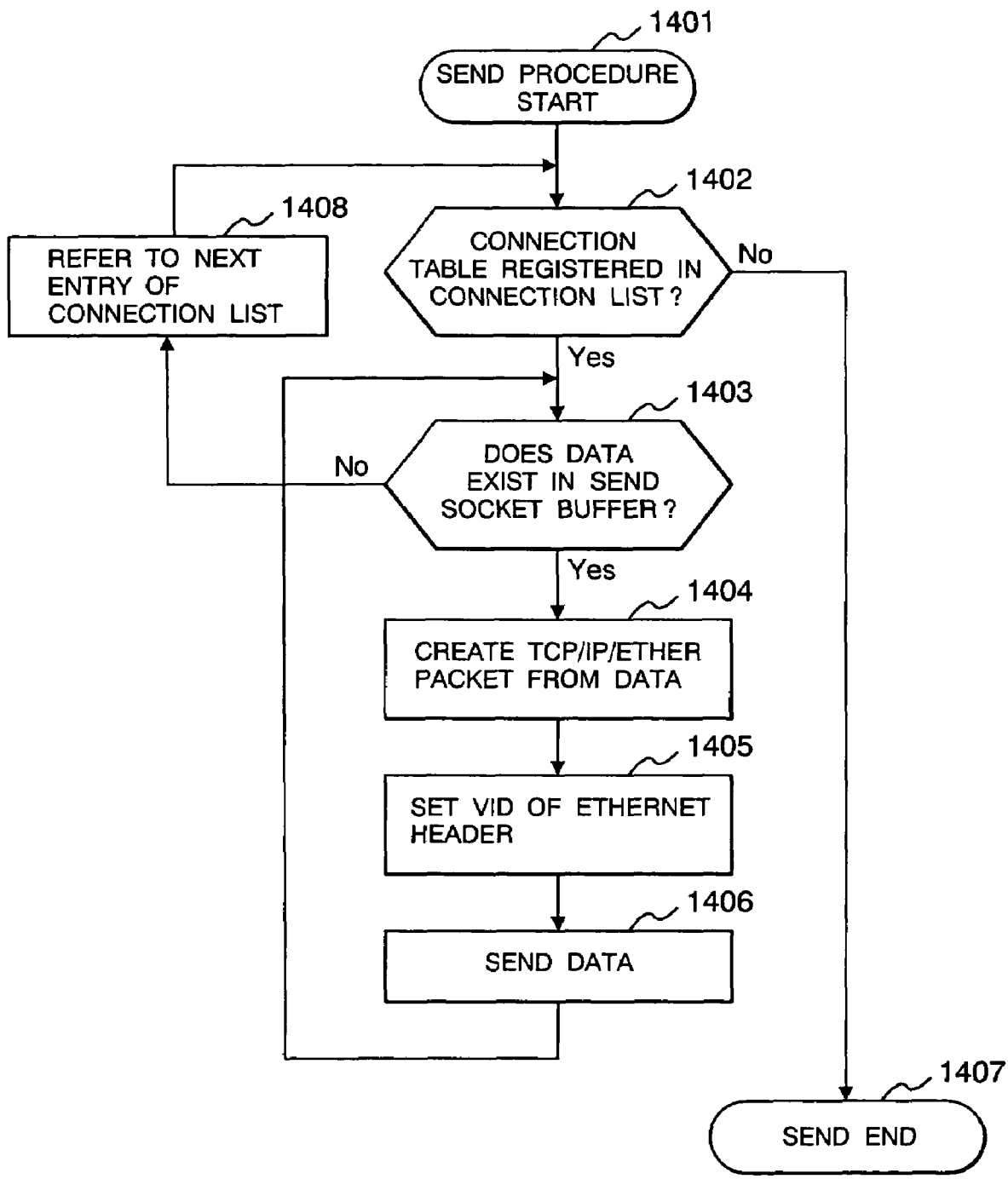
FIG. 14 is a flowchart showing a send procedure in one embodiment.

Next, with reference to FIG. 14, a description will be made of a procedure by which the server 102 sends a packet.

The processes for Company A (the second process 512 for executing the program for Company A management 502 and the third process 513 for executing the file server program 503) store data in the send socket buffer 606 when sending a packet after a connection has been established, and send (kick) a send start signal to the TOE equipment 106 through the path or switch 105. Alternatively, the TOE equipment 106 may kick itself at a fixed interval of time with a timer. The kicked TOE equipment 106 performs sending according to a flowchart of FIG. 14 (1401).

The TOE processor 107 searches the connection list 1201 (1402) for data of a send socket buffer 606 registered in the connection table 1202 (1403). If data exists in the send socket buffer 606, it generates a TCP/IP/Ether packet from the data (TCP/IP protocol processing) (1404). At this time, it stores the value of VLAN-ID (#1) of the connection table 1202 in the VID field (#3 in FIG. 4 showing details of TCI of #6 of FIG. 3) (1405) of the Ethernet header (FIG. 3). Then, it sends the data to the network (1406).

This operation is repeated until the send socket buffer 606 empties, and further it is repeated for all connection tables 1202 registered in the connection list 1201 (1408).

Receive Procedure

Figure 15:
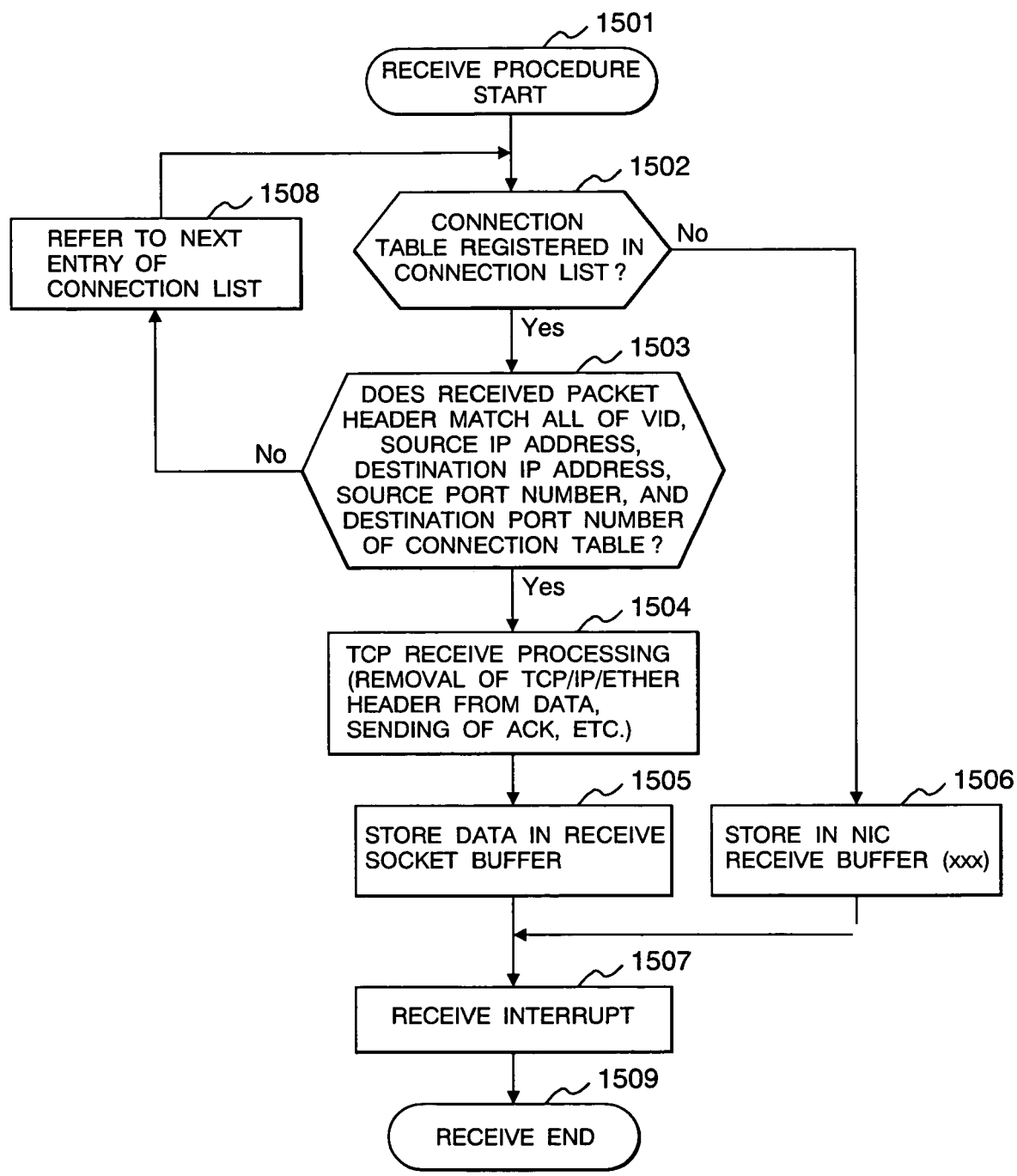
FIG. 15 is a flowchart showing a receive procedure in one embodiment.

Next, with reference to FIG. 15, a description will be made of a procedure by which the server 102 receives a packet.

A VLAN-tagged Ethernet packet is inputted to the TOE equipment 106 from the physical port 109. A processing procedure executed when the TOE processor 107 within the TOE equipment 106 receives a packet is shown in a flowchart of FIG. 15.

Upon receiving a packet, the TOE processor 107 checks whether a connection table 1202 is registered in the connection list 1201 (1502). Next, it checks whether VID (#3 in FIG. 4 showing details of TCI of #6 of FIG. 3), source IP address, destination IP address, source port number, and destination port number all match the values of the registered connection table 1202 (1503). If all of them match, since the packet belongs to the connection, the TOE processor performs ordinary TCP receive processing for the received packet, such as removing TCP/IP/Ether header from data, ACK sending, and SEQ increasing (1504), and stores data with the header removed in the receive socket buffer 607 (1505). If not all of them match, the above processing is repeated for all other connection tables 605 (1508). If the packet does not belong to any connections, the TOE processor 107 stores the packet in the receive buffer 552 of the NIC interface buffer 541 (1506). Finally, the TOE processor 107 sends a receive interrupt indication signal to the host processor (1507) and terminates the receive processing (1509).

Other Embodiment

Figure 13:
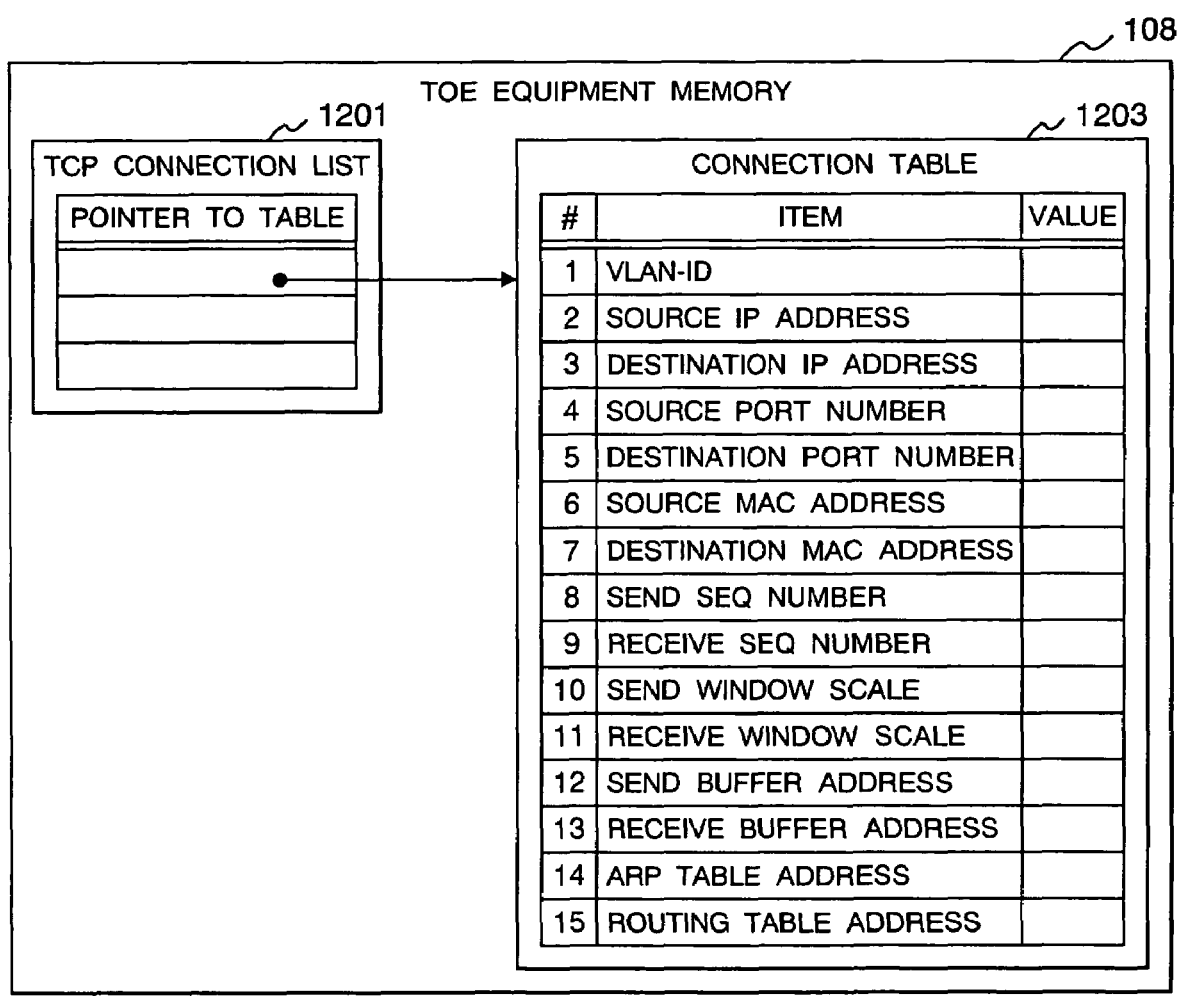
FIG. 13 is a drawing showing a drawing showing an example 2 of the TOE equipment memory 108 in one embodiment.

A possible embodiment different from the abovementioned embodiment is, for example, that connection establishment, routing solution, ARP solution, and the like are performed by the TOE. For this purpose, as shown in FIG. 11, the connection information block 1101 is added with an ARP table address (#14) and a routing table address (#15). Moreover, in the memory 108 within the TOE equipment 106, as shown in FIG. 13, the connection table 1203 is added with an ARP table address (#14) and a routing table address (#15).

By this arrangement, for example, when a connection has been newly established, or when a network configuration has been changed resulting in change of a route to a destination host, the TOE equipment refers to the ARP Table 602 and the routing table 603 of the host memory to solve an IP address and a MAC address of a gateway. Thereby, connection establishment and the like that have been performed in the abovementioned can be performed.

As described above, conventional TOE equipment has carried out VLAN-ID-based network separation and demarcation at no more than the Ethernet level (the data link layer of the OSI reference model). By this embodiment, however, network separation and demarcation based on VLAN-ID has been made possible up to the TCP connection level (the session level of the OSI reference model).

What is claimed is:

1. A server having a network protocol processing function, comprising:
   a host processor that processes user requests received through a network;
   a host memory storing, on a user basis, network setting information including: a port list in which network ports available to a user are described; an ARP table that indicates correspondences between IP addresses of other hosts connected to the same VLAN and MAC addresses; a routing table showing a next host to which a packet is to be transferred, with respect to an IP address of a given destination host; a TCP connection table including a source IP address, a destination IP address, a source port number, a destination port number, and VLAN-ID defined by IEEE802.1Q; and a connection list storing a pointer indicating the TCP connection table; and
   TOE equipment including: a network port connected to the network; a TOE processor for performing TCP/IP protocol processing; and a TOE memory holding at least information for identifying TCP connections,
   wherein the host processor creates the TCP connection table in network setting information of a certain user, registers a pointer to the TCP connection table in the connection list, establishes a TOP connection for the user, and passes a connection information block including at least a source P address, a destination IP address, a source port number, and a destination port number, and VLAN-ID defined by IEEE802.1Q, which are stored in the TOP connection information table, to the TOE equipment, wherein the TOE processor, based on information of the connection information block, newly creates a connection table in the TOE memory, registers a pointer to the connection table in the connection list, if data exists in a send socket buffer registered in the connection table, creates a TCP/IP packet from the data, stores VLAN-ID defined by IEEE802.1Q in a specific field of the packet, and sends the packet, and wherein, when receiving a packet, the TOE processor determines whether the pointer to the connection table is registered in the connection list, checks whether VLAN-ID, a source IP address, a destination IP address, a source port number, and a destination port number within the received packet match values registered in the connection table, and if all match, performs TCP receive processing for the received packet.

* * * * *